(12) United States Patent
Ni

(10) Patent No.: US 12,112,032 B2
(45) Date of Patent: *Oct. 8, 2024

(54) CONTROLLING A DEVICE BASED ON PROCESSING OF IMAGE DATA THAT CAPTURES THE DEVICE AND/OR AN INSTALLATION ENVIRONMENT OF THE DEVICE

(71) Applicant: GOOGLE LLC, Mountain View, CA (US)

(72) Inventor: Yuzhao Ni, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,902

(22) Filed: May 3, 2023

(65) Prior Publication Data

US 2023/0273716 A1 Aug. 31, 2023

Related U.S. Application Data

(63) Continuation of application No. 17/552,938, filed on Dec. 16, 2021, now Pat. No. 11,644,964, which is a
(Continued)

(51) Int. Cl.
*G06F 3/04847* (2022.01)
*G06F 3/04883* (2022.01)
(Continued)

(52) U.S. Cl.
CPC ...... *G06F 3/04847* (2013.01); *G06F 3/04883* (2013.01); *G06V 20/10* (2022.01); *H04N 23/631* (2023.01)

(58) Field of Classification Search
CPC ............. G06F 3/04847; G06F 3/04883; G06F 3/0488; G06F 3/011; H04N 23/631; H04L 12/2814

See application file for complete search history.

(56) References Cited

U.S. PATENT DOCUMENTS 8,681,178 B1 3/2014 Tseng
8,941,560 B2 * 1/2015 Wong .................. G06F 3/011
345/7
(Continued)

FOREIGN PATENT DOCUMENTS

CN 102906810 1/2013
CN 105160854 12/2015
(Continued)

OTHER PUBLICATIONS

European Patent Office; Communication issued in Application No. 22195645.1; 9 pages; dated Jan. 17, 2023.
(Continued)

*Primary Examiner* — Mong-Shune Chung
(74) *Attorney, Agent, or Firm* — Gray Ice Higdon

(57) ABSTRACT

Implementations discussed herein relate to systems, methods, and apparatuses for controlling one or more internet of things (IoT) devices via a graphical camera interface of a portable electronic device. The graphical camera interface can be presented at the portable electronic device in response to the user accessing a camera application via the portable electronic device and directing a camera of the portable electronic device at the IoT device. One or more images generated from an output of the camera can be processed to identify the IoT device that the user is intending to control. Information related to a context in which the user aimed their camera at the IoT device can be used to assist in narrowing down a selection of the IoT device from multiple different IoT devices that may be associated with the user and/or an image captured by the camera.

17 Claims, 7 Drawing Sheets

Related U.S. Application Data continuation of application No. 16/339,269, filed as application No. PCT/US2018/052460 on Sep. 24, 2018, now Pat. No. 11,256,405.

(51) Int. Cl.
G06V 20/10 (2022.01)
H04N 23/63 (2023.01)

(56) References Cited

U.S. PATENT DOCUMENTS

| | | | |
|---|---|---|---|
| 9,690,348 B2 | 6/2017 | Chin et al. | |
| 9,773,345 B2 | 9/2017 | Stirbu et al. | |
| 10,007,413 B2 * | 6/2018 | Hill | G06F 3/017 |
| 10,841,174 B1 * | 11/2020 | Ely | G02B 27/0172 |
| 11,256,405 B2 | 2/2022 | Ni | |
| 2009/0239587 A1 | 9/2009 | Negron et al. | |
| 2011/0040870 A1 | 2/2011 | Wynn et al. | |
| 2011/0115816 A1 * | 5/2011 | Brackney | G06T 19/006 700/295 |
| 2015/0348554 A1 * | 12/2015 | Orr | G05B 15/02 |
| 2015/0351204 A1 | 12/2015 | Hershberg et al. | |
| 2016/0073151 A1 * | 3/2016 | Keller | H04N 21/44008 348/734 |
| 2016/0148417 A1 | 5/2016 | Kim et al. | |
| 2017/0231064 A1 * | 8/2017 | Lawrenson | G06F 3/017 |
| 2017/0315825 A1 | 11/2017 | Gordon et al. | |
| 2018/0039477 A1 | 2/2018 | Sung et al. | |
| 2018/0151060 A1 | 5/2018 | Griffin | |
| 2018/0157398 A1 * | 6/2018 | Kaehler | G06V 10/464 |
| 2018/0165854 A1 | 6/2018 | Du | |
| 2018/0232608 A1 | 8/2018 | Pradeep et al. | |
| 2019/0251835 A1 | 8/2019 | Yu | |
| 2019/0391716 A1 * | 12/2019 | Badr | G06F 3/0482 |
| 2020/0022072 A1 * | 1/2020 | Cho | H04L 67/51 |
| 2022/0107725 A1 | 4/2022 | Ni | |

FOREIGN PATENT DOCUMENTS

| | | | |
|---|---|---|---|
| CN | 106164959 | 11/2016 | |
| EP | 3214536 | 9/2017 | |
| EP | 3214536 A1 * | 9/2017 | G06F 1/1637 |
| JP | 2012090077 | 5/2012 | |
| JP | 2016110379 | 6/2016 | |

OTHER PUBLICATIONS

Japanese Patent Office; Decision of Rejection issued in App. No. 2020-569824, 4 pages, dated Sep. 12, 2022.
The Korean Intellectual Property Office: Notice of Allowance issued in Application No. 10-2020-7035892, 3 pages, dated Jul. 26, 2022.
Australian Government; Examination Report No. 1 issued in Application No. 2021205110, 2 pages, dated Jul. 14, 2022.
China National Intellectual Property Administration: Notice of Grant for Application No. 201880094614.7, 4 pages, dated Aug. 3, 2022.
Australian Government, Notice of Acceptance of Patent Application issued in Application No. 2021205110, 3 pages, dated Aug. 24, 2022.
China National Intellectual Property Administration: Second Office Action issued for Application No. 201880094614.7, 6 pages, dated Apr. 25, 2022.
European Patent Office; Intention to Grant issued in Application No. 21167156.5, 46 pages, dated May 11, 2022.
Korean Intellectual Property Office; Notice of Office Action issued in Application Ser. No. KR10-2020-7035892; 10 pages; dated May 24, 2022.
Japan Patent Office; Notice of Reasons for Rejection issued in Application No. 2020-569824, 5 pages, dated Jan. 31, 2022.
Intellectual Property India; Examination Report issued in Application No. 202027053612; 7 pages; dated Dec. 17, 2021.
International Search Report and Written Opinion of PCT Ser. No. PCT/US2018/052460 dated Dec. 3, 2018.
European Patent Office; Communication under Rule 71(3) EPC issue in Application No. 18789732.7; 49 pages; dated Nov. 27, 2020.
Australian Patent Office; Notice of Allowance issued in Application No. 2018443902; 3 pages; dated Apr. 29, 2021.
European Patent Office; Communication issued in Application No. 21167156.5; 7 pages; dated Jun. 29, 2021.
China National Intellectual Property Administration; Notification of First Office Action issued in Application No. 201880094614.7; 31 pages; dated Oct. 18, 2021.
Jianxin, S.; 3D real-time map design based on Android platform; dated Oct. 15, 2015.
McCann, E. et al.; Multi-user multi-touch command and control of multiple simulated robots; ACM/IEEE International Conference on Human-Robot Interaction (HRI); 2 pages; dated Jul. 30, 2030.
Australian Government; Examination Report issued in Application No. 2022271496, 2 pages, dated Oct. 25, 2023.
Australian Government; Notice of Acceptance issued in Application No. 2022271496, 3 pages, dated Nov. 28, 2024.
Intellectual Property India; Hearing Notice issued for Application No. 202027053612, 3 pages, dated Apr. 26, 2024.
European Patent Office, Intention to Grant issued in Application No. 22195645.1; 49 pages; dated Jul. 3, 2024.

* cited by examiner

CONTROLLING A DEVICE BASED ON PROCESSING OF IMAGE DATA THAT CAPTURES THE DEVICE AND/OR AN INSTALLATION ENVIRONMENT OF THE DEVICE

BACKGROUND

An individual can, within their home, have a number of connected devices that can be controlled by various applications. Such connected devices can include, for example, smart light bulbs, smart plugs, smart locks, smart thermostats, smart security systems, smart appliances, etc. In some instances, a particular application can be provided for controlling a particular connected device. However, the particular application must be installed at a client device. Moreover, to control the particular connected device the user must identify the particular application from amongst a bevy of applications installed at the client device, select the application to cause it to be executed at the client device, then navigate within the particular application to identify and control the particular connected device. In addition to requiring a relatively large quantity of user inputs to control the particular connected device, significant client device resources (e.g., processor and/or battery) can be consumed by a user identifying the particular application, by executing the particular application, and/or by rendering content from the particular application as the user navigates within the particular application to identify and control the particular device. Additionally, such a particular application can consume memory of the client device. Such memory consumption can be exacerbated in many situations where the client device has limited memory resources and/or in situations where the client device is utilized to control many disparate connected devices, each having a respective particular application for control of the respective connected device.

SUMMARY

The present disclosure is generally directed to methods, apparatus, computer-executable instructions, computer-executable programs, and computer-readable media (transitory and non-transitory) for controlling one or more devices via an interface of a portable client device. Specifically, a user can activate a graphical camera interface and direct a camera, of the portable client device, at a particular connected device in order to initialize an interface for controlling the particular connected device. The particular connected device can be controlled via the interface based at least in part on processing image data, from the camera, and determining that the image data captures the particular connected device and/or an installation environment of the particular connected device. The particular connected device can be, for example, a smart light bulb, a smart television, and/or other smart device, and the user can control and/or configure the device using the camera of the portable client device and one or more interfaces of the portable client device. In this way, the user does not necessarily have to rely on a variety of individual applications to control various devices in their home, but, rather, can employ their camera to indicate to their portable client device that they would like to control a particular controllable device. This can allow a user to free up space and processing bandwidth at their portable client device as a result of not necessarily requiring the user to install, open, or switch between every application that has been provided by the manufacturers of the various controllable devices in order to control the devices. For example, in a scenario where a user wishes to control two or more controllable devices, the user does not necessarily need to rely on two or more separate applications installed at his/her client device to control the controllable devices. The user may instead be provided with a facility to control the two or more controllable devices via a camera-related user interface at the client device, thereby avoiding any need for the client device to switch between different applications associated with each controllable device. It will be appreciated that this can save processing burden and reduce power usage at the client device. Furthermore, various implementations disclosed herein reduce a quantity of user inputs needed to control a controllable device. For example, some of those implementations enable a user to provide a single input (e.g., tap, long-tap, tap-and-drag, etc.) at a graphical camera interface that captures a controllable device and/or an installation environment of the devices, or a graphical element overlaid on the graphical camera interface, and for the controllable device to be controlled responsive to the single input. For instance, a user can direct a camera of a portable client device at a targeted device to be controlled, and provide an input (e.g., a tap) to an interface of the portable client device in order to control the targeted device. This streamlined control of the targeted device(s) improves the interaction between the user and the client device when controlling the targeted device(s).

In some implementations, a user can access an automated assistant and/or camera application from their portable client device, and direct a camera of their portable client device at a particular controllable device to indicate that the user is interested in controlling the particular controllable device. The controllable device can be, for example, an appliance such as an oven. An output of the camera can be converted into image data for processing at the portable client device and/or a computing device that is accessible from the portable client device over a network (e.g., the internet). The image data can undergo image recognition processing at the portable client device and/or another computing device to identify whether a controllable device is graphically represented in the image data (i.e., the user is directing their camera at the controllable device).

In some implementations, identification of a controllable device from the image data can be based on data generated during an interaction between the user and the portable client device, or other computing device. Additionally, or alternatively, identification of a controllable device from the image data can be based on data provided by a manufacturer of the controllable device and/or another third party, relative to a provider of the automated assistant. Based on processing of the image data, one or more candidate devices can be identified as being the controllable device that the user has targeted by directing their camera at the controllable device. Each candidate device can be assigned a metric that characterizes a probability and/or a confidence that a candidate device is the controllable device that the user is intending to target, that is represented by the image data, and/or that is a particular controllable device located within the home of the user. When a particular candidate device is assigned a metric that indicates a greater probability or confidence that the candidate device is the controllable device, compared to other candidate devices, the portable client device can determine that the particular candidate device is the controllable device.

Additionally, or alternatively, a process for identifying the controllable device can include providing an identifier for an identity of the controllable device, and/or data that characterizes features of the controllable device, adjustable settings of the controllable device, and/or one or more operational statuses of the controllable device. The portable client device can use the aforementioned data for interpreting inputs to an interface of the portable client device, when the portable client device is graphically representing the controllable device. For instance, the controllable device can have an adjustable setting that can be on or off, and a current operational status or state of the controllable device can be "off." The portable client device can use this data to process a tap gesture, received at a touch screen display of the portable client device when the touch screen display is graphically representing the controllable device, and cause the controllable device to have an "on" status.

In some implementations, the touch screen display can continue displaying images based on an output of the camera, thereby graphically representing an environment in which the controllable device is disposed. However, concurrent to displaying those images, the portable client device can enable the touch screen display to receive one or more different types of touch gestures, such as a tap, swipe, multi-finger gesture, a gesture based on movement of one or more appendages of the user, and/or any other gesture that can be received at a touch screen display. In this way, there would be no overlaid graphical user interface, but, rather, the user could actually tap on the graphical representation of the controllable device. In some implementations, the portable client device can identify a location of the graphical representation of the controllable device within the touch screen display and limit gestures for controlling the controllable device to that portion of the touch screen display. Additionally, or alternatively, the portable client device can identify multiple different controllable devices disposed within the environment, and graphically depict the multiple different controllable devices at the touch screen display. Furthermore, the portable client device can enable the touch screen display to receive one or more different types of gestures at portions of the touch screen display where each graphical representations of each controllable device is depicted, and enable control of each respective controllable device via one or more gestures at a respective portion of the touch screen display. For instance, when a user is directing their camera at a lamp and a television, and each of the lamp and the television are simultaneously displayed at the touch screen display, the user can tap on the graphical representation of the lamp to turn off the lamp and tap on the graphical representation of the television to turn on the television. Furthermore, each portion of the touch screen display can receive one or more different types of gestures of gestures, such as a tap gesture for turning on the television, and a slide gesture to lower a brightness of the lamp.

In some implementations, a selectable element can be presented at the touch screen display for controlling the controllable device. The selectable element can be generated based on one or more adjustable settings that have been identified as corresponding to the controllable device. For instance, a selectable element can include the text "on" or "off," depending on an operational status of lamp to be controlled, and the operational status of the lamp can be modified in response to the user tapping the selectable element. The coordinates of the selectable element can be away from a graphical representation of the device to be controlled, in order to not interfere with a user being able to view the device via the touch screen display. For instance, if a light of a lamp is graphically represented at the top of the touch screen display, the selectable element for toggling the operational status of the lamp can be provided at the bottom of the touch screen display. Additionally, or alternatively, the portable client device can allow camera controls to still be available when gestures for controlling a controllable device via the touch screen display are also enabled. In this way, should a user desire to modify an operational status of a controllable device simultaneous to taking a picture, the user can, for example, tap on the graphical representation of the controllable device to control the controllable device, and then provide another input to cause the camera to capture an image.

In some implementations, a user can provide spoken utterances to an automated assistant interface, such as a microphone, in order to modify an adjustable setting of a controllable device, while the controllable device is graphically represented at the touch screen display. This can allow an automated assistant to distinguish between other controllable devices that might be candidates for being controlled according to spoken utterances. For instance, a user working in a scientific laboratory may have multiple lamps available to him/her for providing specific lighting conditions in the laboratory—e.g. to provide particular wavelengths of EM radiation to test samples. A spoken utterance such as "Assistant, turn on the lamp," may not provide much context with which to help identify the lamp that the user is referring to. However, when the user is directing a camera of their portable client device at a particular lamp, while saying "Assistant, turn on the lamp," the automated assistant can determine, based on contextual data and the spoken utterance, that the user would like that particular lamp to be turned on. In another example, a user can have multiple televisions in their home, therefore a spoken utterance such as "Assistant, turn on the television," may not provide much context with which to help identify the television that the user is referring to. However, when the user is directing a camera of their portable client device at a particular television, while saying "Assistant, turn on the television," the automated assistant can determine, based on contextual data and the spoken utterance, that the user would like that particular television to be turned on. The contextual data can include, but is not limited to, a location of the portable client device, a direction of the portable client device as indicated by one or more sensors of the portable client device, a time at which the user provided the spoken utterance, information associated with the user, and/or any other information that can characterize a context in which a user provided a command.

In some implementations, contextual data, along with image processing techniques discussed herein, can be used in determining a controllable device that the user is intending to control via their touch screen display simultaneous to the user directing their camera at the controllable device. Such contextual data can include, but is not limited to, room adjacency data that characterizes a layout of rooms within a location (e.g., a home) associated with the user. The room adjacency data can be generated over time as the user performs activities within their home (or other location), provides room data (e.g., labels for rooms such as "living room," "bedroom," etc. or "laboratory 1", laboratory 2", etc.), and/or otherwise acts to provide inferences about where particular rooms are within their home (or other location). In some implementations, a location of a network router can be stored in association with room adjacency data in order that the automated assistant can determine where a particular device is based on signal strength available to the particular device. For instance, a device that is on the same floor (e.g., a first floor) as the network router can have more network connectivity than if the device were located on a different floor (e.g., a basement floor). Other contextual data can also be used to determine the controllable device that the user is directing their camera at, such as, but not limited to, global position system (GPS) data, gyroscope sensor data, image data, temperature data (e.g., for comparing a temperature at the device to a known temperature of one or more rooms), trajectory data, and/or any other location data that can be used to determine a location of a portable client device within a particular room. In some implementations, contextual data can be used to determine that a particular controllable device is a targeted device of multiple candidate devices, thereby breaking a "tie" that may be exhibited when metrics are calculated. For instance, two or more candidate devices can be assigned the same metric, or metrics that are all within a tolerance. In order to further limit the candidate devices to a single candidate device, contextual data can be used to reduce a number of candidate devices to a single candidate device.

In some implementations, image data and contextual data can be used to identify a particular controllable device that a user is intending to target from multiple similar devices within their home. For example, a user may have two of the same types of lamps located in different parts of their home. Contextual data, such as network connectivity of a portable client device and/or direction of a camera, can be used in combination with image data to determine the particular lamp that the user is directing their camera at. For instance, when the user is directing their camera at a first lamp of the two lamps, the portable client device that includes the camera can have a first Wi-Fi network strength and a direction sensor of the portable client device can indicate that the portable client device is being pointed in a first direction. Furthermore, when the user is directing their camera at a second lamp of the two lamps, the portable client device can have a second Wi-Fie network strength and be directed in a second direction. An application or device that is tasked with identifying the targeted lamp can use this contextual data (e.g., Wi-Fi signal strength and/or camera direction) along with one or more images of one of the lamps to determine that the user is intending to control one of the two lamps. In this way, when the user provides an input gesture to their portable client device, when a graphical representation of one of the lamps is provided at a touch screen display of the portable client device, a command corresponding to the input gesture can be transmitted to the lamp that has been identified from the image data and the contextual data.

The above description is provided as an overview of some implementations of the present disclosure. Further description of those implementations, and other implementations, are described in more detail below.

In some implementations, a method implemented by one or more processors is set forth as including operations such as causing, by a portable client device, a graphical camera interface to be provided at a touch screen display of the portable client device, wherein the graphical camera interface provides a graphical representation of an environment at which a camera of the portable client device is directed. The method can further include determining, based on image data provided by the camera when the camera is directed at the environment and based on processing of the image data provided by the camera, that the graphical representation of the environment portrays a controllable electronic device that is located within the environment.

The method can further include determining, in response to determining that the graphical representation of the environment portrays the controllable electronic device, an adjustable setting of the controllable electronic device, wherein the adjustable setting, when modified, alters at least one state of the controllable electronic device. The method can further include receiving, at the touch screen display of the portable client device, a selection at the graphical camera interface; and causing, in response to receiving the selection at the graphical camera interface, the adjustable setting of the controllable electronic device to be modified.

In some implementations, determining that the graphical representation of the environment portrays the controllable electronic device comprises: processing the image data using a trained machine learning model to generate one or more respective instances of output; and determining that the one or more respective instances of output are most indicative of the controllable electronic device. In some implementations, each respective instance of the one or more respective instances of the output is a respective embedding, and wherein determining that the one or more respective instances of output are most indicative of the controllable electronic device comprises: comparing one or more of the respective embeddings to a plurality of candidate embeddings, the plurality of candidate embeddings including a given embedding for the controllable electronic device, and one or more additional embeddings for one or more additional controllable electronic devices. In some implementations, the given embedding for the controllable electronic device is personal to an account associated with the portable client device, and wherein the given embedding is previously generated based on a plurality of prior images previously captured by the portable client device or another portable client device associated with the account, and wherein the given embedding is previously associated with the controllable electronic device based on previous user interface input that associated the capture of the prior images with the controllable electronic device.

In some implementations, determining that the graphical representation of the environment portrays the controllable electronic device that is located within the environment is further based on sensor data from an additional sensor of the portable client device, the additional sensor being a non-vision sensor. In some implementations, the method can include determining, based on a sensor output of a sensor of the portable client device, an orientation of the portable client device when the camera is directed at the environment. In some implementations, the orientation is determined at least partially based on a network connectivity of the portable client device and consolidated layout data that identifies a specific location of a network router relative to the portable client device. In some implementations, the method can include assigning control of the adjustable setting to a particular area of a portion of the graphical camera interface that is portraying the controllable electronic device, wherein the selection at the graphical camera interface is received at the particular area to which the adjustable setting is assigned.

In some implementations, the method can include generating, based on determining the adjustable setting of the controllable electronic device, a selectable element configured to be presented by a touch display panel when the graphical camera interface is portraying the controllable electronic device, wherein the selection the graphical camera interface is received at the selectable element. In some implementations, the method can include determining, in response to receiving the selection at the graphical camera interface that is portraying the controllable electronic device, a type of input gesture performed by the user when the user provided the selection at a particular portion of the graphical camera interface. In some implementations determining the adjustable setting of the controllable electronic device includes determining multiple different adjustable settings of the controllable electronic device, and determining the type of input gesture includes determining the type of gesture from multiple different types of input gestures, each gesture of the multiple different types of input gestures are assigned to a particular adjustable setting of the multiple different adjustable settings. In some implementations, causing the adjustable setting to be modified comprises transmitting, from the portable client device, at least one command that corresponds to the selection.

In other implementations, a method implemented by one or more processors is set forth as including operations such as receiving, from a portable client device, image data that characterizes a location of a controllable electronic device within an environment, wherein image data is generated based on an output of a camera of a portable client device, when a user is directing the camera at the environment. The method can also include determining, based on processing of the image data received from the portable client device, a metric that characterizes a confidence that the controllable electronic device is a targeted controllable electronic device, wherein the targeted controllable electronic device is preconfigured to be remotely controlled via the portable client device. The method can further include, when the metric indicates that the controllable electronic device is ranked over another metric corresponding to another controllable device that is capable of being remotely controlled via the portable client device: identifying, based on the confidence score that the controllable electronic device is the targeted controllable electronic device, an adjustable setting of the targeted controllable electronic device, providing, based on identifying the adjustable setting, control data to the portable client device, wherein the control data characterizes the adjustable setting of the targeted controllable electronic device, and causing the portable client device to provide a graphical user interface that is accessible via a touch screen display of the portable client device and configured to receive a user input gesture, for modifying the adjustable setting of the determinate controllable electronic device, simultaneous to the portable client device portraying the environment at the graphical camera interface.

In some implementations, the method can include receiving, from the portable client device, contextual data that characterizes an operational feature of the portable client device, wherein identifying the adjustable setting of the targeted controllable electronic device is further based on the contextual data. In some implementations, the image data characterizes an arrangement of the targeted controllable electronic device relative to another controllable electronic device that is located within the environment and is also preconfigured to be remotely controlled via the portable client device. The method can further include, when the metric indicates that the controllable electronic device is ranked over the other metric score: receiving user input data that characterizes a particular user input gesture provided by the user at a portion of the touch screen display that is portraying a graphical representation of the controllable electronic device.

In some implementations, the portable client device includes an automated assistant application that is configured to enable responsiveness of the camera to another input gesture simultaneous to the portable client device providing the graphical user interface that is accessible via the touch screen display. In some implementations, determining the metric includes processing the image data according to an operation that is based on training data that corresponds to at least one previously received image that included a graphical representation of the controllable electronic device.

In yet other implementations, a method implemented by one or more processors is set forth as including operations that include receiving image data corresponding to an output of a camera that is integral to a portable client device and is directed at an environment that includes multiple controllable electronic devices when the camera provided the output, wherein the portable client device includes an automated assistant interface that is configured to provide an interface between a user and an automated assistant. The method can further include determining that a user input was received at the automated assistant interface, wherein the user input is associated with an action for modifying an adjustable setting of a target controllable electronic device of the multiple controllable electronic devices. The method can further include determining multiple metrics based on processing of the image data, wherein each metric of the multiple metrics characterizes a probability that a corresponding controllable electronic device of the multiple controllable electronic devices is the target controllable electronic device that the user is intending to control via the automated assistant interface. The method can further include, when a particular metric of the multiple metrics indicates that a particular controllable electronic device of the multiple controllable electronic devices is the target controllable electronic device: determining, based at least on the image data, the adjustable setting of the particular controllable electronic device, and causing, in accordance with the user input received at the automated assistant interface, the adjustable setting of the particular controllable electronic device to be modified.

In some implementations, the method can further include, when the multiple metrics do not indicate that at least one controllable electronic device the target controllable electronic device: determining other multiple metrics based on contextual data that characterizes an operating status of each controllable electronic device of the multiple controllable electronic devices. In some implementations, the contextual data also characterizes a particular location of each controllable electronic device of the multiple controllable electronic devices relative to the environment. In some implementations, the particular location characterized by the contextual data is at least partially based on a location of the user during a prior interaction between the user and at least one controllable electronic device of the multiple controllable electronic devices, and the method further comprises: when the multiple metrics do not indicate that at least one controllable electronic device is the target controllable electronic device: determining that the other multiple metrics indicate that the particular controllable electronic device is the target controllable electronic device.

In some implementations, the user input is a spoken utterance that is provided simultaneous to the particular controllable electronic device being graphically represented at a touch screen display of the portable client device. In some implementations, the user input is a gesture provided at a touch screen display of the portable client device simultaneous to the touch screen display graphically representing the particular controllable electronic device. In some implementations, the gesture is a slide gesture that includes an appendage sliding against a surface of the touch screen display in one or more dimensions.

In yet other implementations, a method implemented by one or more processors is set forth as including operations such as determining that a user is requesting that a controllable device, disposed within an environment of the user, be configured for responding to an input gesture, wherein the input gesture is a user input provided to a touch screen display of a computing device when a graphical representation of the controllable device is portrayed at the touch screen display of the computing device. The method can further include processing image data received from the computing device, wherein the image data is based on an output of a camera of the computing device when the camera is directed at the controllable device. The method can further include determining, based on processing the image data, an adjustable setting of the controllable device, wherein the adjustable setting, when modified, alters at least one state of the controllable device. The method can further include causing, based on determining the adjustable setting of the controllable device, data associated with the user to characterize a correlation between the input gesture and the adjustable setting of the controllable device, wherein the computing device is configured to receive the input gesture at the touch screen display and cause a command to be provided to the controllable device to modify the at least one state of the controllable device.

In some implementations, the method can further include causing, in response to determining that the user is requesting a controllable device be configured for responding to an input gesture, an automated assistant, that is accessible to the computing device, provide a natural language output requesting that the user capture one or more images of the controllable device using the camera of the computing device. In some implementations, processing the image data received from the computing device includes applying the image data to a machine learning model and determining, based on an output of the machine learning model, a device type that characterizes the controllable device, wherein determining the adjustable setting is further based on the device type. In some implementations, processing the image data received from the computing device further includes generating an embedding for an embedding space based on the output of the machine learning model. In some implementations, the embedding is generated based on the image data applied to the machine learning model and contextual data accessible to the computing device. In some implementations, the embedding space includes one or more other candidate embeddings that correspond to one or more other controllable devices.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
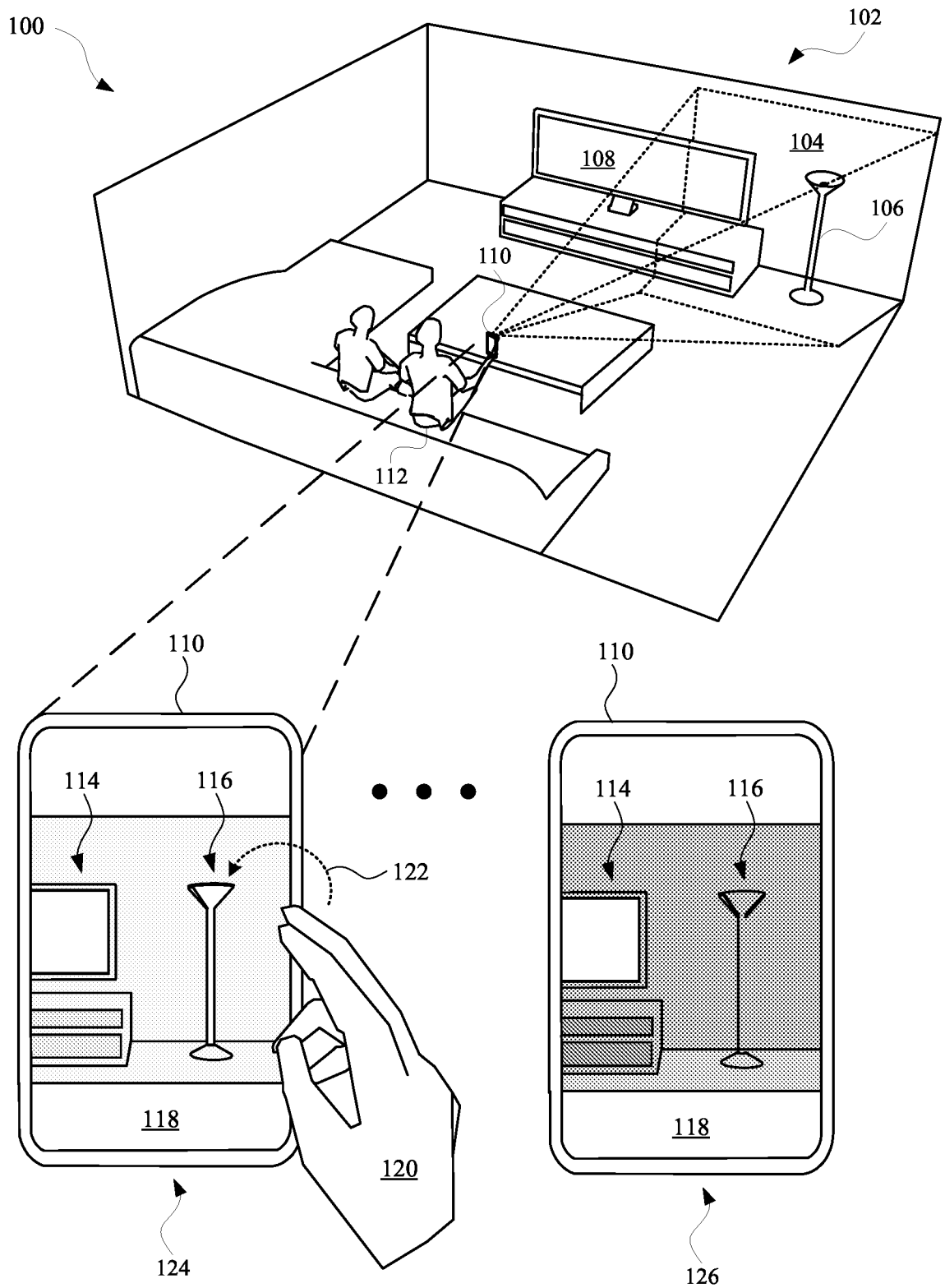
FIG. 1 illustrates a view of a user modifying an adjustable setting of a first controllable device via a touch screen display of a computing device.

FIG. 1 illustrates a view 100 of a user 112 modifying an adjustable setting of a first controllable device 106 via a touch screen display 118 of a computing device 110. As a non-limiting example, the user 112 can desire to watch a television 108 in an environment 102, however, movement of the user 112 may be temporarily hindered by one or more factors, such as an emergency occurring within the environment 102, a health-related condition of the user 112, another task that the user 112 is currently devoted to, an obstacle within the environment 102, and/or any other feature that can be a hindrance of movement. As a result of such a limitation on movement, a user 112 may not be able to perform certain tasks at a particular time, such as when the user 112 is watching the television 108. This can be problematic when another device within the environment 102 is interfering with a task being performed by the user 112. However, the implementations discussed herein relate to enabling the user 112 to control certain devices by providing an input to a computing device when the user 112 is directing a camera of the computing device at a device to be controlled.

In some implementations, a user 112 can be watching the television 108 (or otherwise engaging with a second controllable device) and desire that a lamp to be turned off in order that light from the television 108 would have less interference from light emitted by the lamp (i.e., the first controllable device 106). In order to control an adjustable setting of the lamp, and according to implementations discussed herein, the user 112 can direct a camera of their computing device 110 in a direction of the lamp. The camera can be directed at a portion 104 of the environment 102 that includes the first controllable device 106 and the second controllable device, in order to cause the first controllable device 106 and the second controllable device to be graphically represented at the touch screen display 118 of the computing device 110.

The computing device 110 can be operating a camera-related application, such as, but not limited to, an assistant application that provides access to the camera in order to direct an automated assistant to perform particular actions. In some implementations, the computing device 110 can include a camera application for capturing images, and the computing device 110 can allow the user 112 to control a particular controllable device while the camera application is opened at the computing device 110. When the user 112 has directed the camera at the portion 104 of the environment 102, and at least a graphical representation 116 of the first controllable device 106 is presented at the touch screen display 118, the user 112 can provide a gesture 122 with their hand 120 in order to control the first controllable device 106. The gesture 122 can be received at a portion of the touch screen display 118 that is displaying the graphical representation 116 of the first controllable device 106, thereby indicating that the user 112 is targeting the first controllable device 106 in order to adjust a setting of the first controllable device 106.

In response to receiving the gesture 122, the computing device 110 can cause a command to be transmitted to the first controllable device 106 in order to modify the adjustable setting of the first controllable device 106. The adjustable setting can be, for example, a control for turning on or off a light of the first controllable device 106. Therefore, if the light of the first controllable device 106 is on when the user 112 provides the gesture 122, the computing device 110 can cause an "off" command to be provided to the first controllable device 106 in order to cause the light to be turned off. As illustrated in a first interface 124 of the touch screen display 118, the first controllable device 106 can be in an "on" state, and, in response to the user 112 providing a gesture 122 at the first interface 124, can cause the first controllable device 106 to transition into an "off" state, as illustrated in a second interface 126 of the touch screen display 118. In some implementations, an adjustable setting for each of the first controllable device 106 and the television 108 can be identified, and the computing device 110 can be configured to allow the user 112 to modify the adjustable setting of the television 108 and the first controllable device 106 from the same interface. For instance, when the user 112 provides a gesture 122 to modify an adjustable setting of the first controllable device 106, the user 112 can thereafter provide another gesture to modify an adjustable setting (e.g., volume, channel, brightness, etc.) of the television 108, when the touch screen display is providing a graphical representation 114 of the television 108 and the graphical representation 116 of the first controllable device 106.

Figure 2:
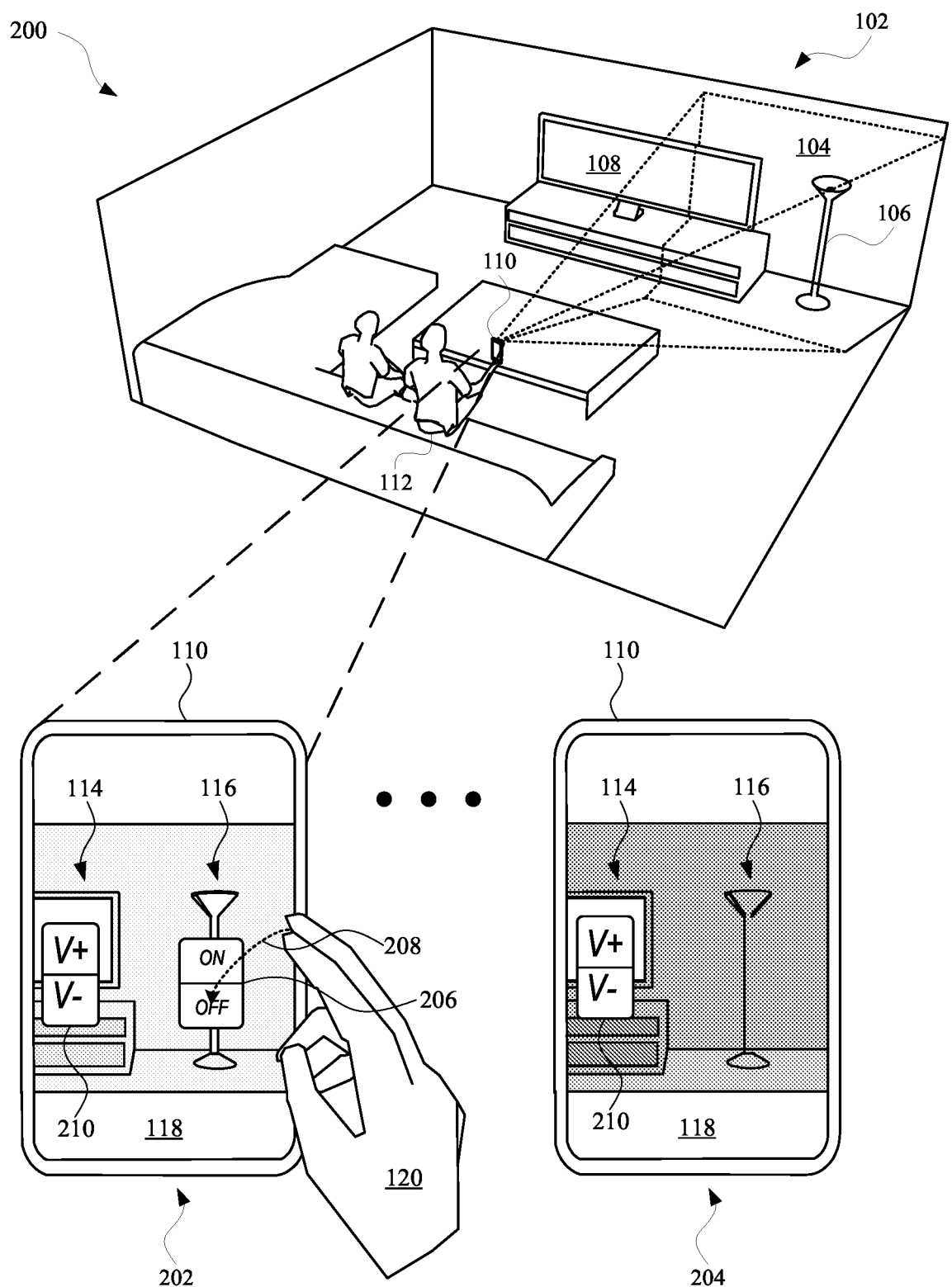
FIG. 2 illustrates a view of an implementation in which the computing device provides one or more selectable elements simultaneous to graphical representations of one or more controllable devices being presented at an interface of the computing device.

FIG. 2 illustrates a view 200 of an implementation in which the computing device 110 provides one or more selectable elements simultaneous to graphical representations of one or more controllable devices being presented at an interface of the computing device 110. Specifically, in some implementations, selectable elements can be provided at the touch screen display 118 based on a type of controllable device that is being graphical represented at the touch screen display 118 based on output from a camera of the computing device 110 and/or one or more adjustable settings that are associated with the controllable devices that are graphical represented at the touch screen display 118. For instance, when the user 112 is directing a camera of the computing device 110 at a portion 104 of the environment 102, the graphical representation 114 and the graphical representation 116 can be presented at the touch screen display 118. The graphical representation 114 can correspond to one or more images, image data, and/or a stream of images, captured by the camera, that characterize or otherwise portray at least a portion of the television 108. The graphical representation 116 can correspond to one or more images, image data, and/or a stream of images, captured by the camera, that characterize or otherwise portray at least a portion of the first controllable device 106.

When the user 112 is directing the camera of the computing device 110 at the portion 104 of the environment 102, the computing device 110 can cause an output of the camera (e.g., image data) to be processed in order to identify where objects are located within the environment 102 and/or a graphical representation of the portion 104 of the environment 102. Additionally, or alternatively, an output of the camera can be processed in order to classify objects that are identified within the environment 102 and/or a graphical representation of the portion 104 of the environment 102. For instance, an output of the camera and/or one or more images based on an output of the camera can be applied as input to a machine learning model. The machine learning model can generate, as output, one or more values that can be mapped to an embedding space. The embedding space can be previously generated according to one or more images captured by a camera in order to train the machine learning model to classify particular objects. When the one or more values (e.g., vectors) have been mapped in the embedding space, distances between one or more mapped values and one or more locations in the embedding space can be measured. Each location within the embedding space can correspond to a classification for a particular object, and, therefore, when a mapping of values (e.g., a vector) is closer to one location in the embedding space than any other, an object identified within the image can be classified as the object corresponding to the closest location.

In some implementations, a metric corresponding to a difference between two or more distances from a mapping to a location corresponding to an object classification can be determined and compared with other metrics in order to determine how to classify a particular object within an image. In some implementations, when two or more metrics are within a threshold tolerance of each other, contextual data can be used to break a "tie" between the two or more metrics and ultimately classify an object in an image according to a particular object classification. For instance, contextual data can include data from one or more sensors of the computing device 110 when the user 112 was directing the camera at the portion 104 of the environment 102. Such data can characterize signal strength, direction, tilt, brightness, elevation, temperature, audio properties, and/or any other properties that can be associated with a context of an object.

When the object has been classified, adjustable settings associated with the object can then be identified based on an identity or classification of the object. For example, the lamp can be associated with an "ON/OFF" adjustable setting, and the television 108 can be associated with a "CHANNEL +/−" adjustable setting and a "VOLUME +/−" adjustable setting. An adjustable setting for each classified object can be indicated to the computing device 110 and the computing device 110 can generate, based on each adjustable setting, a selectable element for selection by the user 112. For example, in response to determining that a television and a lamp are characterized by an output of the camera of the computing device 110 and/or graphically represented at the touch screen display 118, the computing device 110 can present a first selectable element 210 and a second selectable element 206 at the touch screen display 118. The user 112 can provide a gesture 208 to select a portion of the first selectable element 210, in order to modify an operating state of the first controllable device 106 (e.g., turn off the lamp), as provided in a first graphical user interface 202. Simultaneously, the first selectable element 210 can remain at the touch screen display 118 as long as the user 112 is directing the camera at the portion 104 of the environment 102 and the user has not selected the first selectable element 210, as provided as a second graphical user interface 204. In some implementations, the second selectable element 206 can be removed from the touch screen display 118 after the user 112 provides the gesture 208, or the second selectable element 206 can remain at the touch screen display 118 as long as the user 112 is directing the camera at the portion 104 of the environment 102.

Figure 3:
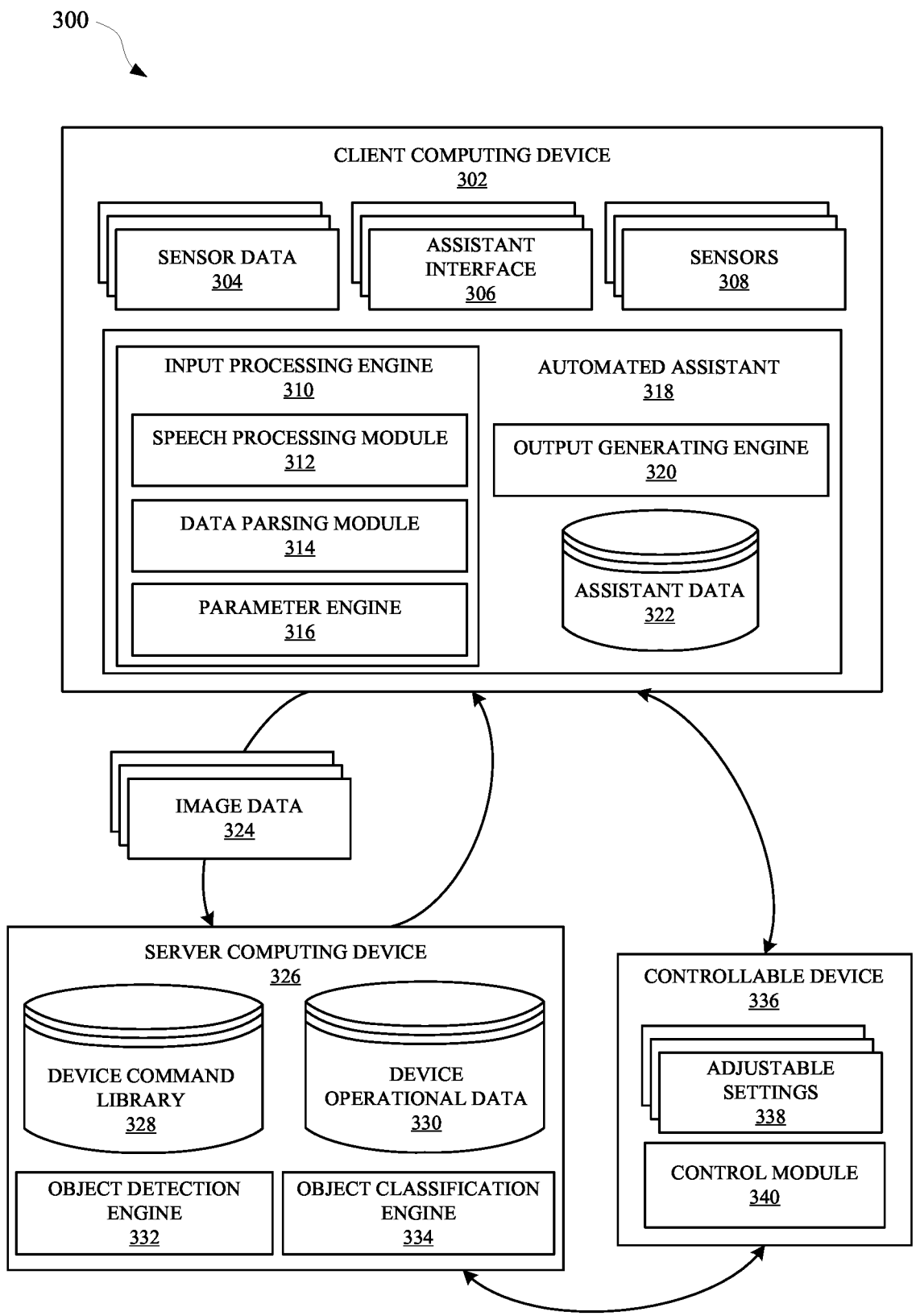
FIG. 3 illustrates a system for providing a client device with an ability to control particular controllable devices that can be graphically represented at a display panel of the client device.

FIG. 3 illustrates a system 300 for providing a client device with an ability to control particular controllable devices that can be graphically represented at a display panel of the client device. The system 300 can include a client computing device 302 that is in communication with a server computing device 326 and/or a controllable device 336. The client computing device 302 can include an automated assistant 318, which can operate as part of an automated assistant that is provided at one or more computing devices, such as a first client device (e.g., a cellular phone), a second client device (e.g., a standalone speaker device), and/or a remote computing device, such as a server computing device 326. A user can interact with the automated assistant 318 via one or more an assistant interfaces 306, which can include a microphone, a camera, a touch screen display, a user interface, and/or any other apparatus capable of providing an interface between a user and an application. For instance, a user can initialize the automated assistant 318 by providing a verbal, textual, and/or a graphical input to the assistant interface to cause the automated assistant 318 to perform a function (e.g., provide data, control a peripheral device, access an agent, etc.). A client computing device 302 that provides at least a portion of the automated assistant 318 can include a display device, which can be a display panel that includes a touch interface for receiving touch inputs and/or gestures for allowing a user to control applications of the client computing device 302 via the touch interface. In some implementations, the client computing device 302 can lack a display device, thereby providing an audible user interface output, without providing a graphical user interface output. Furthermore, the client computing device 302 can provide a user interface, such as a microphone, for receiving spoken natural language inputs from a user.

The client computing device 302 can be in communication with the server computing device 326 over a network, such as the internet. The client computing device 302 can offload computational tasks to the server computing device 326, such as speech processing tasks, in order to conserve computational resources at the client computing device 302. For instance, in some implementations, the server computing device 326 can host the automated assistant 318, and the client computing device 302 can transmit inputs received at one or more assistant interfaces 306 to the server computing device 326. However, in some implementations, the automated assistant 318 can be hosted at the client computing device 302. In various implementations, all or less than all aspects of the automated assistant 318 can be implemented on the client computing device 302. In some of those implementations, aspects of the automated assistant 318 are implemented via a local automated assistant of the client computing device 302 and interface with the server computing device 326 that implements other aspects of the automated assistant 318. The server computing device 326 can optionally serve a plurality of users and their associated automated assistants via multiple threads. In implementations where all or less than all aspects of the automated assistant 318 are implemented via a local automated assistant of the client computing device 302, the local automated assistant can be an application that is separate from an operating system of the client computing device 302 (e.g., installed "on top" of the operating system)—or can alternatively be implemented directly by the operating system of the client computing device 302 (e.g., considered an application of, but integral with, the operating system).

In some implementations, the client computing device 302 can include a speech processing module 312 that can process audio data received at an assistant interface 306 to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a data parsing module 314 and made available to the automated assistant 318 as textual data that can be used to generate and/or identify command phrases from the user. In some implementations, output data provided by the data parsing module can be provided to a parameter engine 316 to determine whether the user has provided an input that corresponds to a particular action capable of being performed by the automated assistant and/or an application or agent that is capable of being accessed by the automated assistant. For example, assistant data 322 can be stored at the client computing device 302 and include data that defines one or more actions capable of being performed by the automated assistant 318, as well as parameters necessary to perform the actions. The input processing engine 310 can determine that a user has requested a particular action be performed, the parameter engine 316 can determine one or more parameters for the particular action, and an output generating engine 320 can provide an output to the user cased on the particular action and/or the one or more parameters. For instance, in some implementations, in response to a user input, such as a gesture provided to a touch screen display of the client computing device 302, the automated assistant 318 can cause a command to be transmitted to the controllable device 336, according to some implementations discussed herein.

In some implementations, an ability of the client computing device 302 to control a controllable device 336 can depend on training a machine learning model that can identify the controllable device 336 and/or classify the controllable device 336 from the image data 324. A machine learning model can be trained using images previously captured by one or more cameras, and/or other data provided by one or more sensors of one or more computing devices. For instance, when a user acquires a controllable device and attempts to configure the controllable device, the user can invoke an automated assistant for help. The user can provide a spoken utterance to an automated assistant interface 306, such as, "Assistant, help me configure my device." In response, the automated assistant 318 can provide a natural language output such as, "Ok, please take a picture of the device," or "Ok, from a variety of perspectives, please direct your camera at the device." Thereafter, the automated assistant 318 can cause any image provided by the user, for example via a camera of the user's client device, to be processed according to an object detection process for designating where objects are in an image. Thereafter, each image can be processed according to an object classification process. Initially, the object classification process can be based on device data explicitly provided by the user and/or a manufacturer of the device. For instance, when the device has never been connected to the client computing device 302 prior to configuration, the automated assistant 318 can request the user to use their camera (e.g. the camera of the client computing device 302) to scan a UPC, barcode, and/or other identifying label located on the device or packaging of the device. Using a resulting image from the scan, the automated assistant 318 can perform a query to identify an identity of the device, and/or any other features or operational data corresponding to the device.

When the device has been identified, an embedding space can be generated and/or modified to include an embedding that corresponds to the identity of the device and/or a category of the device. Furthermore, the embedding within the embedding space can be further defined using information obtained using other images of the device within an environment, such as a home of the user, or a room within a home of the user. Other information obtained when the user captures the images can also be used to determine whether an image provided via a camera of a client computing device includes particular device. For instance, information such as Wi-Fi signal strength, tilt, direction, temperature, elevation, distance traveled, view from other another camera, time of day, location, and/or any other data that can be associated with a device can be characterized by contextual data that can be used to develop the embedding within the embedding space for a controllable device.

In some implementations, an object detection engine 332 and/or an object classification engine 334 accessible from a server computing device 326 can access an embedding space. The object detection engine 332 and object classification engine 334 can access one or more embedding spaces in order to compare an instance of output from a machine learning model to candidate embeddings of the embedding space. Each candidate embedding can correspond to a different controllable device.

In some implementations, the object classification engine 334 can apply image data 324, generated based on an output of a camera of the client computing device 302, to a machine learning model as input. An instance of output generated based on applying the image to the machine learning model can be mapped to the embedding space, in order to determine a candidate embedding that the instance of output is closest to. In some implementations, the instance of output can be a vector that can be mapped to the embedding space, and distance of the vector from a candidate embedding in the embedding space can indicate whether the image data 324 includes data characterizing an image of at least a portion of a controllable device corresponding to the candidate embedding. This distance (i.e., metric) can be generated for each candidate embedding, and each distance can be compared to identify the candidate embedding that has the shortest distance from the instance of output that has been mapped from the image data 324.

In some implementations, the server computing device 326 can store and/or access an embedding space that has been generated for a particular account corresponding to a user, and/or an embedding space that has been generated for multiple accounts corresponding to multiple users. For instance, an embedding space can be generated based on images and other device information provided by a user and/or one or more device associated with an account of the user. In this way, the embedding space can be adapted for recognizing particular devices that are disposed about an environment in which that user has previously been located.

When the machine learning model has been trained and an embedding space has been generated, a user can direct one or more sensors 308 (e.g., a camera) at a particular controllable device 336 in order to be provided with an interface for controlling the controllable device 336. A sensor 308, such as the camera, can provide an output that can be stored as sensor data 304 at the client computing device 302. The sensor data 304 can be converted into image data 324, using one or more processors and memory of the client computing device 302. The image data 324 can then be passed to the server computing device 326 over a network, such as the internet, in order for the image data 324 to be processed by the object detection engine 332 and the object classification engine 334. When a graphical representation of a controllable device 336 has been located within the image data 324, and the controllable device 336 has been classified and/or otherwise identified, the server computing device 326 can identify operational data 330 associated with the controllable device 336. For instance, when the controllable device 336 is a lamp, device operational data 330 corresponding to the lamp can characterize different modes (e.g., on, off, low-brightness, high-brightness, etc.) of the lamp, and/or an operating status (e.g., currently on) of the lamp.

Such operational data 330 associated with the identified controllable device 336 can be transmitted back to the client computing device 302, and the client computing device 302 can generate an interface that is at least partially based on the device operational data 330. For instance, the client computing device 302 can cause a touch screen display 118 to be receptive to input gestures at a portion of the touch screen display 118 that is providing a graphical representation of the controllable device 336. An input gesture, such as a tap, can be received at the portion of the touch screen display in order to cause an adjustable setting 338 of the controllable device 336 to be modified. The adjustable setting 338 can be, for example, an "on" setting of the controllable device 336, which can be modified to be turned "off" in response to the gesture received at the touch screen display. In some implementations, when a gesture is received at the touch screen display of the client computing device 302, while the touch screen display is graphical representing the controllable device 336, a command can be transmitted directly to the controllable device 336 and/or to the server computing device 326. In implementations where a gesture causes a command to be sent directly to the controllable device 336, a control module 340 of the controllable device 336 can receive the command, and cause an adjustable setting 338 corresponding to the command to be adjusted. The controllable device 336 can therefore process commands in order to determine how to adjust an operational status of the controllable device 336 in order to fulfill the command. In implementations where a gesture causes a command to be provided to the server computing device 326, the server computing device 326 can receive the command, and access a device command library 328 for determining the command the user is intending to employ. Thereafter, the server computing device 326 can provide a command to the controllable device 336 in order to modify an adjustable setting of the controllable device 336 according to the determined command. Furthermore, an operational status, characterized by the device operational data 330, can be updated to reflect the modification to the adjustable setting 338 of the controllable device 336. Additionally, or alternatively, the controllable device 336 can communicate to the client computing device 302 in response to an adjustable setting of the controllable device 336 being adjusted, in order to indicate an operational status of the controllable device 336 to the client computing device 302.

In some implementations, one or more different types of gestures can be received at the touch screen display of the client computing device 302 in order to modify an adjustable setting 338 of the controllable device 336. For instance, when the controllable device 336 includes a speaker, the adjustable setting 338 can be a volume setting and a type of gesture that can be used to control the volume can be a two-dimensional gesture (e.g., swiping the touch screen display) or a three-dimensional gesture (e.g., rotating two fingers on the touch screen display).

Figure 4A:
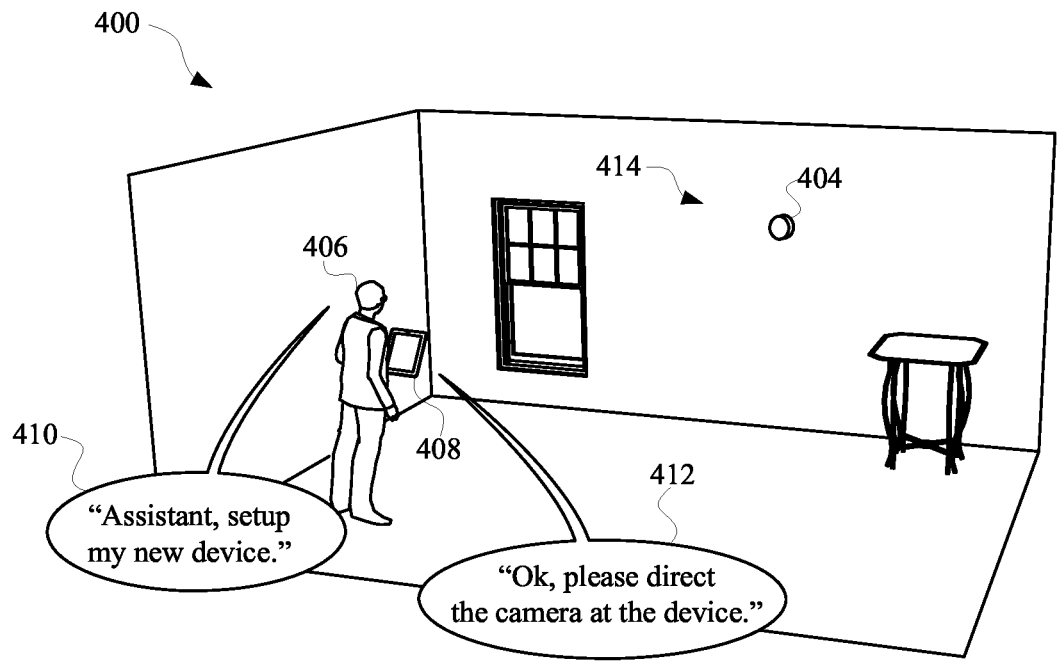
FIG. 4A and FIG. 4B illustrate a perspective view and a perspective view, respectively, of a user setting up a controllable device using a camera of a computing device.
Figure 4B:
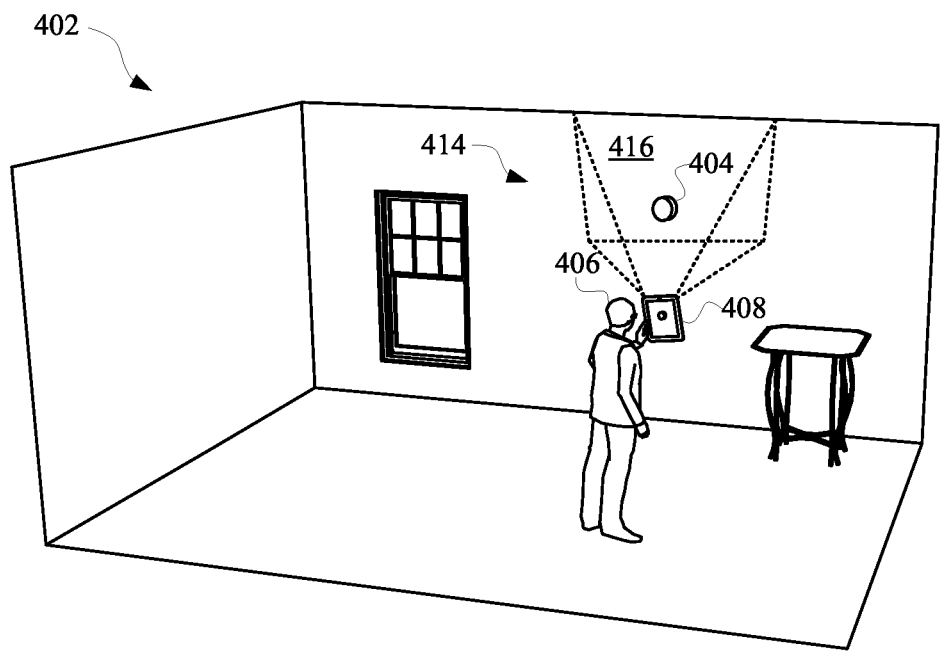

FIG. 4A and FIG. 4B illustrate a perspective view 400 and a perspective view 402, respectively, of a user 406 setting up a controllable device 404 using a camera of a computing device 408. Typically, a user has to directly interact with their devices in order to configure them for operations, for example within their home. However, according to some implementations discussed herein, a user 406 can configure their device using a camera of their computing device 408, and optionally, an automated assistant. The user 406 can initially indicate to the automated assistant that they would like assistant configuring their controllable device 404 by providing a spoken utterance 410 such as, "Assistant, setup my new device." The spoken utterance 410 can be received at an automated assistant interface, such as a microphone, of the computing device 408 and, in response, the automated assistant can provide a natural language output 412 such as, "Ok, please direct the camera at the device."

The user 406 can direct the camera of the computing device 408 at the controllable device 404, as illustrated in FIG. 4B. Specifically, the user 406 can direct the camera at an environment 414 within their home and a portion 416 of the environment 414 can be characterized by image data that is generated based on an output of the camera. The image data can then be processed in order to identify whether one or more objects are characterized by the image data, and, if so, identify a classification for each object characterized by the image data. The classification can indicate an identity of the controllable device, thereby allowing operational data associated with the controllable device 404 to be determined. The automated assistant can then use the operational data to configure the controllable device 404 within the home of the user 406, so that the user 406 can thereafter control the controllable device 404 via a touch screen display of the computing device 408, according to implementations discussed herein.

Figure 5:
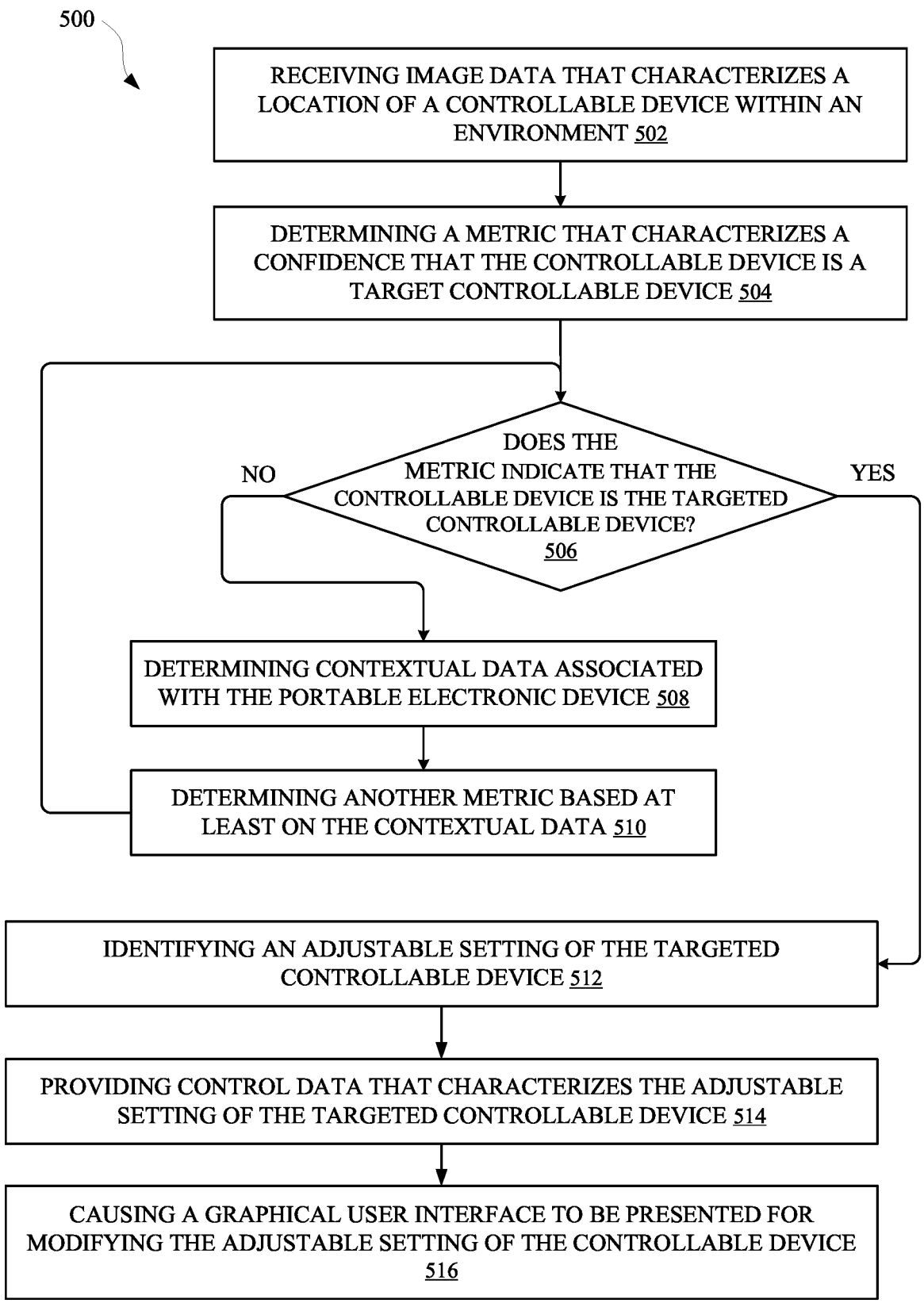
FIG. 5 illustrates a method for determining an adjustable setting of a controllable device when a touch screen display is providing a real-time graphical representation of the controllable device.

FIG. 5 illustrates a method 500 for modifying an adjustable setting of a controllable device using a touch screen display, when the touch screen display is providing a real-time graphical representation of the controllable device. The method 500 can be performed by one or more devices, applications, and/or any other apparatus or module capable of interacting with an electronic device. The method 500 can include an operation 502 of receiving image data that characterizes a location of a controllable device within an environment. The image data can be transmitted by a portable client device, such as a cellular phone, and can be based on an output of camera of the portable client device. The environment, such as a home of the user, can include multiple of the same and/or different controllable devices. Issues can arise when a user is attempting to control a particular controllable device that they have multiples of. For instance, a user can have multiple of the same assistant devices (e.g., computing devices that provide access to an automated assistant), therefore, when a particular assistant device is captured in an image, there can be difficulty when identifying the particular assistant device from the other assistant devices.

The method 500 can further include an operation 504 of determining a metric that characterizes a confidence that the controllable device is a target controllable device. Specifically, the metric can be determined based on an output generated according to an object detection process and/or an object classification process. Multiple different metrics can be determined for multiple candidate devices, however, a candidate controllable device that has been assigned a metric that is distinguished (e.g., higher, lower, or outside of a particular tolerance) from other metrics assigned to other candidate controllable devices can be identified as the controllable device that has been targeted by the user. For example, although the received image data can be used to identify a particular controllable device (e.g., a smart lightbulb) that the user has multiple of scattered throughout their house, other contextual data determined from the image data and/or other data accessible to the portable client device can be used to identify the particular controllable device, within the home, that the user is targeting to control.

The method 500 can also include an operation 506 of determining whether the metric indicates that a particular controllable device is the targeted controllable device. When the metric does not indicate that a particular controllable device is the targeted controllable device, the method 500 can proceed to operation 508. The method 500 at operation 508 can include determining contextual data associated with the client computing device. Contextual data can be provided from the client computing device, which provided the image data, and/or any other device that can be connected to a network with the client computing device. In some implementations, contextual data can include data that is based on outputs of one or more sensors of the client computing device, and/or any other device. The sensors can include a microphone, camera, position sensor, GPS transmitted, Bluetooth transmitter, temperature transmitter, moisture sensor, and/or any other sensor that can be connected to an electronic device.

The method 500 can further include an operation 510 of determining another metric based at least on the contextual data. The other metric can be based on the image data and the contextual data, and can be a modifications of the metric determined at operation 504 or a separate metric that is not a modification of the metric determined at operation 504. In some implementations, multiple other metrics can be determined for each candidate controllable device in order to determine whether a controllable device graphical represented in the image data is a particular controllable device that the user is intending to target. The method 500 can return to operation 506 in order to make this determination, or access other contextual data in order to break a "tie" between candidate controllable devices.

When, at operation 506, the metric or other metric indicates that the controllable device is the targeted controllable device, the method 500 can proceed to operation 512. The method 500 at operation 512 can include identifying an adjustable setting of the targeted controllable device. Specifically, when the targeted controllable device has been identified, operational characteristics of the targeted controllable device can be determined. For example, functions of the targeted controllable device can be determined from data that is accessible to an automated assistant and/or was provided by the user and/or a manufacturer of the targeted controllable device. The functions can be used to modify particular adjustable settings of the targeted controllable device. For instance, a function can include turning on or off the targeted controllable device and therefore an adjustable setting of the targeted controllable device can be an "on/off" power setting. Additionally, or alternatively a function can include modifying an output of the targeted controllable device, and therefore an adjustable setting of the targeted controllable device can be a volume setting, brightness setting, alarm setting, lock setting, charge setting, location setting, account setting, and/or any other setting that can be associated with an electronic device.

The method 500 can also include an operation 514 of providing control data that characterizes the adjustable setting of the targeted controllable device. The control data can be provided by a server computing device to the client computing device. However, in some implementations, the client computing device can determine the control data for modifying an adjustable setting of the controllable device. The control data can then be used by the client computing device for interpreting one or more inputs from the user for controlling the targeted controllable device and/or modifying one or more adjustable settings of the targeted controllable device. Optionally, in some implementations, the method 500 can include an operation 516 of causing a graphical user interface to be provided for modifying the adjustable setting of the controllable device. The graphical user interface can include streaming images of the targeted controllable device as the user is directing a camera of the client computing device at the targeted controllable device. The graphical user interface can be configured to receive one or more different input gestures, which can be processed by the client computing device, converted into a command, based on the command data, and transmitted to the targeted controllable device for modifying one or more adjustable settings of the controllable device. In this way, the client computing device has the ability to distinguish between multiples of the same device within the home, despite graphical representations of the devices being substantially similar.

Figure 6:
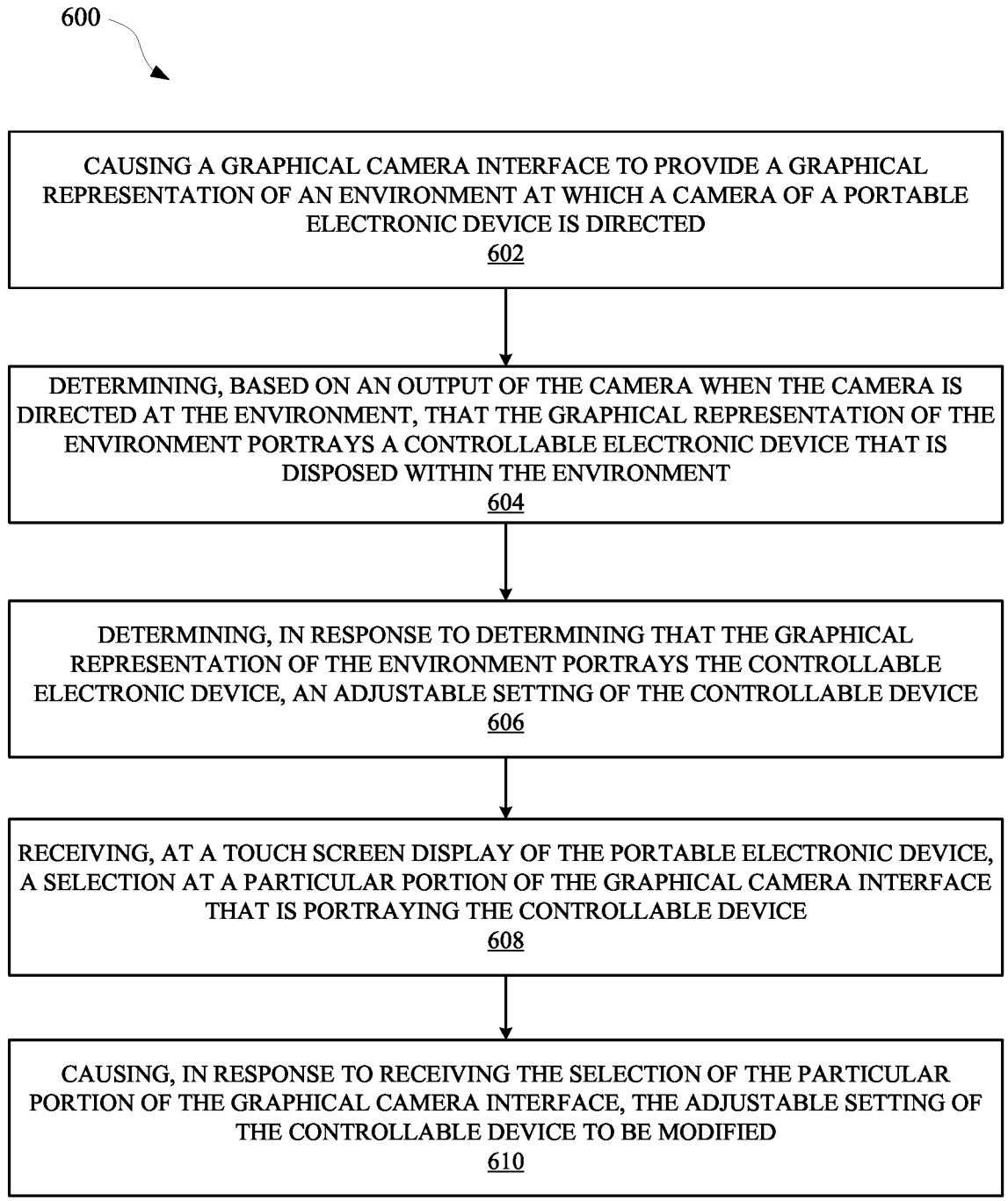
FIG. 6 illustrates a method for modifying an adjustable setting of a controllable device via a touch screen display, when a graphical representation of the controllable device is provided at the touch screen display.

FIG. 6 illustrates a method 600 for modifying an adjustable setting of a controllable device via a touch screen display, when a graphical representation of the controllable device is provided at the touch screen display. The method 600 can be performed by one or more computing devices, applications, and/or any other apparatus or module capable of interacting with an electronic device. The method 600 can include an operation 602 of causing a graphical camera interface to provide a graphical representation of an environment at which a camera of a portable client device is directed. The graphical representation can be a digital representation of the environment, and the digital representation can be generated using image-related data output by the camera of the portable client device.

The method 600 can further include an operation 604 of determining, based on an output of the camera when the camera is directed at the environment, that the graphical representation of the environment portrays a controllable electronic device that is disposed within the environment. The portable client device can determine that the graphical representation of the environment portrays the controllable device by causing an object recognition process and/or object classification process to be applied to image data corresponding to the graphical representation. In some implementations, the image data can be applied to a trained machine learning model and an instance of output of the machine learning model can be mapped to an embedding space to determine a candidate embedding that the image data most closely relates or corresponds to. When a most related candidate embedding is identified, a controllable device corresponding to the candidate embedding can be designated as the controllable device that the user is intending to target with the camera of their portable client device.

The method 600 can further include an operation 606 of determining, in response to determining that the graphical representation of the environment portrays the controllable electronic device, an adjustable setting of the controllable device. When the controllable device has been identified, information about that particular controllable device can be accessed by the portable client device, and various operational characteristics of the controllable device can be determined from the information. Such operational characteristics can include one or more adjustable settings, which can be modified by a device that is separate from the controllable device. In some implementations, the adjustable setting can be a setting that is directly related to a current operation of the controllable device, and/or a setting that is indirectly related to an operation of the controllable device. Such a setting that is indirectly related to an operation of the controllable device can be user permissions corresponding to an account that is associated with the controllable device, security parameters associated with the controllable device, and/or any other setting that can be associated with a device.

The method 600 can also include an operation 608 of receiving, at a touch screen display of the portable client device, a selection at a particular portion of the graphical camera interface that is portraying the controllable device. The particular portion of the graphical camera interface can depict a stream of images that are based on an output of the camera when the camera is directed at the controllable device. When the portable client device determines an identity of the controllable device, the portable client device can, in real-time, assign a portion of the graphical camera interface for receiving input gestures from the user for controlling the controllable device. In some implementations, wherein a controllable device includes multiple portions, buttons, apparatuses, and/or any other sections that can be individually modified or controlled, the portable client device can assign each portion multiple different portions of the graphical camera interface to each respective portion controllable portion of the controllable device. In this way, the user can provide individual gestures to particular portions of the graphical representation of the controllable device in order to modify an adjustable setting corresponding to a particular portion of the controllable device.

The method 600 can further include an operation 610 of causing, in response to receiving the selection of the particular portion of the graphical camera interface, the adjustable setting of the controllable device to be modified. For instance, the portable client device and the controllable device can be connected via a communication protocol such as Bluetooth, LTE, Zigby, Wi-Fi, wired, and/or any other mode of communication between two or more devices. In response to receiving the selection of the particular portion of the graphical camera interface, the portable client device can transmit a signal and/or a command to the controllable device for modifying the adjustable setting. For instance, when the controllable device is a television and the portable client device is a cellular phone, a command can be generated at the portable client device and transmitted to the television over a Wi-Fi network that is accessible to the television and the portable client device.

Figure 7:
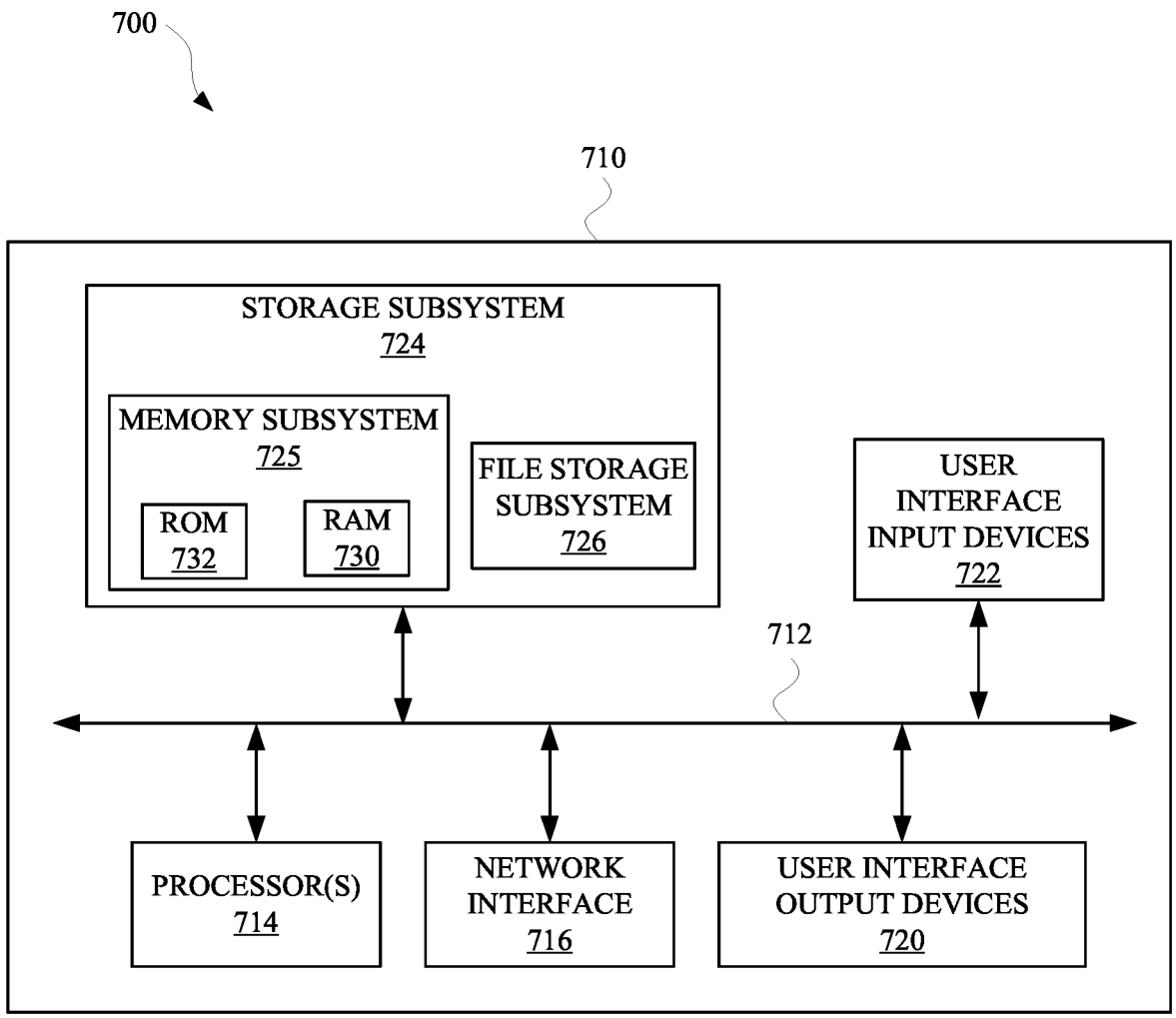
FIG. 7 is a block diagram of an example computer system.

FIG. 7 is a block diagram 700 of an example computer system 710. Computer system 710 typically includes at least one processor 714 which communicates with a number of peripheral devices via bus subsystem 712. These peripheral devices may include a storage subsystem 724, including, for example, a memory 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 500, method 600, and/or to implement one or more of computing device 110, client computing device 302, server computing device 326, controllable device 336, computing device 408, controllable device 404, and/or any other application or apparatus discussed herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:

receiving image data corresponding to an output of a camera that is integral to a portable client device and is directed at an environment, wherein the portable client device includes an automated assistant interface that is configured to provide an interface between a user and an automated assistant;

receiving a spoken utterance from the user, wherein the spoken utterance is directed to the automated assistant;

processing the spoken utterance to identify a request of the user, wherein the request includes a command to adjust a state of a controllable electronic device;

identifying, based on the image data and contextual data that is in addition to the image data, a particular controllable electronic device that is included in the environment and that is captured in the image data;

determining, based on both (i) the command included in the request identified based on the spoken utterance and (ii) the particular controllable electronic device being identified based on the image data and the contextual data, that the request is directed to the particular controllable electronic device, wherein determining that the request is directed to the particular controllable electronic device further comprises:

identifying, based on the image data, an additional controllable electronic device that is included in the environment and that is captured in the image data;

determining a first metric associated the particular controllable device, wherein the first metric indicates a first probability that the request is directed to the particular controllable device;

determining a second metric associated with the additional controllable device, wherein the second metric indicates a second probability that the request is directed to the additional controllable device; and determining, based on the first metric and the second metric, that the particular controllable electronic device, in lieu of the additional controllable electronic device, is the controllable electronic device to which the request is directed; and causing, in response to receiving the request and in response to determining that the request is directed to the controllable electronic device, the state of the particular controllable electronic device to be modified in accordance with the command of the request.

2. The method of claim 1, wherein the contextual data includes room adjacency data that characterizes a layout of the environment.

3. The method of claim 1, wherein the contextual data characterizes a context of the user when the user provided the spoken utterance.

4. The method of claim 1, wherein the contextual data characterizes a context of the portable client device when the image data was captured.

5. The method of claim 1, wherein identifying the particular controllable electronic device is further based on the command.

6. The method of claim 5, wherein identifying the particular controllable electronic device based on the command includes:

determining that the command is related to an adjustable setting of the particular controllable electronic device.

7. A system, comprising:

a portable client device, wherein the portable client device includes one or more processors and memory operably coupled with the one or more processors, wherein the memory stores instructions that, in response to execution of the instructions by one or more processors, cause the one or more processors to perform the following operations:

receiving image data corresponding to an output of a camera that is integral to the portable client device and is directed at an environment, wherein the portable client device includes an automated assistant interface that is configured to provide an interface between a user and an automated assistant;

receiving a spoken utterance from the user, wherein the spoken utterance is directed to the automated assistant;

processing the spoken utterance to identify a request of the user, wherein the request includes a command to adjust a state of a controllable electronic device;

identifying, based on the image data and contextual data that is in addition to the image data, a particular controllable electronic device that is included in the environment and that is captured in the image data;

determining, based on both (i) the command included in the request identified based on the spoken utterance and (ii) the particular controllable electronic device being identified based on the image data and the contextual data, that the request is directed to the particular controllable electronic device, wherein determining that the request is directed to the particular controllable electronic device further comprises:

identifying, based on the image data, an additional controllable electronic device that is included in the environment and that is captured in the image data;

determining a first metric associated the particular controllable device, wherein the first metric indicates a first probability that the request is directed to the particular controllable device;

determining a second metric associated with the additional controllable device, wherein the second metric indicates a second probability that the request is directed to the additional controllable device; and determining, based on the first metric and the second metric, that the particular controllable electronic device, in lieu of the additional controllable electronic device, is the controllable electronic device to which the request is directed; and causing, in response to receiving the request and in response to determining that the request is directed to the controllable electronic device, the state of the particular controllable electronic device to be modified in accordance with the command of the request.

8. The system of claim 7, wherein the contextual data includes room adjacency data that characterizes a layout of the environment.

9. The system of claim 7, wherein the contextual data characterizes a context of the user when the user provided the spoken utterance.

10. The system of claim 7, wherein the contextual data characterizes a context of the portable client device when the image data was captured.

11. The system of claim 7, wherein identifying the particular controllable electronic device is further based on the command.

12. The system of claim 11, wherein identifying the particular controllable electronic device based on the command includes:

determining that the command is related to an adjustable setting of the particular controllable electronic device.

13. A non-transitory computer readable storage medium configured to store instructions that, when executed by one or more processors, cause the one or more processors to perform operations that include:

receiving image data corresponding to an output of a camera that is integral to a portable client device and is directed at an environment, wherein the portable client device includes an automated assistant interface that is configured to provide an interface between a user and an automated assistant;

receiving a spoken utterance from the user, wherein the spoken utterance is directed to the automated assistant;

processing the spoken utterance to identify a request of the user, wherein the request includes a command to adjust a state of a controllable electronic device;

identifying, based on the image data and contextual data that is in addition to the image data, a particular controllable electronic device that is included in the environment and that is captured in the image data;

determining, based on both (i) the command included in the request identified based on the spoken utterance and (ii) the particular controllable electronic device being identified based on the image data and the contextual data, that the request is directed to the particular controllable electronic device, wherein determining that the request is directed to the particular controllable electronic device further comprises:

identifying, based on the image data, an additional controllable electronic device that is included in the environment and that is captured in the image data;

determining a first metric associated the particular controllable device, wherein the first metric indicates a first probability that the request is directed to the particular controllable device;

determining a second metric associated with the additional controllable device, wherein the second metric indicates a second probability that the request is directed to the additional controllable device; and determining, based on the first metric and the second metric, that the particular controllable electronic device, in lieu of the additional controllable electronic device, is the controllable electronic device to which the request is directed; and causing, in response to receiving the request and in response to determining that the request is directed to the controllable electronic device, the state of the particular controllable electronic device to be modified in accordance with the command of the request.

14. The non-transitory computer readable storage medium of claim 13, wherein the contextual data includes room adjacency data that characterizes a layout of the environment.

15. The non-transitory computer readable storage medium of claim 13, wherein the contextual data characterizes a context of the user when the user provided the spoken utterance.

16. The non-transitory computer readable storage medium of claim 13, wherein the contextual data characterizes a context of the portable client device when the image data was captured.

17. The non-transitory computer readable storage medium of claim 13, wherein identifying the particular controllable electronic device is further based on the command.

* * * * *